United States Patent
Räsänen et al.

(10) Patent No.: US 6,810,234 B1
(45) Date of Patent: Oct. 26, 2004

(54) MOBILE TELEPHONE NETWORK ACCESS

(75) Inventors: Juhana Räsänen, Espoo (FI); Petteri Koponen, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/868,843

(22) PCT Filed: Dec. 22, 1999

(86) PCT No.: PCT/FI99/01073
§ 371 (c)(1),
(2), (4) Date: Sep. 28, 2001

(87) PCT Pub. No.: WO00/38443
PCT Pub. Date: Jun. 29, 2000

(30) Foreign Application Priority Data

Dec. 22, 1998 (FI) ................................. 982777
Jul. 19, 1999 (FI) ................................. 991623

(51) Int. Cl.[7] .............................................. H04B 7/00
(52) U.S. Cl. ................................. 455/41.2; 455/414.1
(58) Field of Search .......................... 455/7, 11.1, 41.1, 455/41.2, 41.3, 414.2, 414.1; 379/39, 40, 90.01, 93.12

(56) References Cited

U.S. PATENT DOCUMENTS

| | | | | |
|---|---|---|---|---|
| 5,343,493 A | * | 8/1994 | Karimullah | 375/130 |
| 5,598,459 A | * | 1/1997 | Haartsen | 455/411 |
| 5,991,749 A | * | 11/1999 | Morrill, Jr. | 705/44 |
| 6,111,869 A | * | 8/2000 | Esmailzadeh et al. | 370/342 |
| 6,157,814 A | * | 12/2000 | Hymel et al. | 340/7.56 |
| 6,397,057 B1 | * | 5/2002 | Malackowski et al. | 455/414.1 |
| 6,430,268 B1 | * | 8/2002 | Petite | 379/39 |

FOREIGN PATENT DOCUMENTS

| | | |
|---|---|---|
| EP | 0663785 A | 7/1995 |
| EP | 0896488 A1 | 2/1999 |
| WO | WO97/01943 | 1/1997 |
| WO | WO97/47125 | 12/1997 |
| WO | WO99/35864 | 7/1999 |
| WO | WO00/01118 | 1/2000 |

OTHER PUBLICATIONS

Invertix Brochure, "IM–Anywhere, System Description", undated.
SignalSoft, Internet web page, url=www.signalsoftcorp.com/products/, Jan. 18, 2001.
CTMotion, Internet web page, url=www.ctmotion.com/content/cell2asp, Jan. 18, 2001.
Air2Web, Internet web page, url=www.air2web.com/wireless.jsp, Jan. 18, 2001.

(List continued on next page.)

Primary Examiner—Quochien B. Vuong
Assistant Examiner—Duy K Le
(74) Attorney, Agent, or Firm—Burns, Doane, Swecker & Mathis, L.L.P.

(57) ABSTRACT

A method of conveying electronic information from a stationary or mobile device such as a vending machine (1) to a mobile telephone network (14). The method comprises taking at least partial temporary control over the mobile terminal to provide temporary connectivity to a mobile telephone network via a wireless communication link between the mobile or stationary device and said terminal, transmitting the information from the stationary or mobile device (1) to a mobile terminal (8) in close proximity to said device (1) via a wireless communication link (RI1). The information is then relayed from the mobile terminal (8) to the mobile network (14) via the mobile network radio link (RI2).

11 Claims, 2 Drawing Sheets

OTHER PUBLICATIONS

FolloWap, Internet web page, url=www.followap.com/products.html, Mar. 16, 2001.

Airflash, Internet web page, url=www.airflash.com/services.html, Jan. 19, 2001.

Oz.com, Internet web page, url=www.oz.com/oz, Jan. 23, 2001.

InfoSpace, Internet web page, url=www.infospace.com, Jan. 23, 2001.

WindWire, Internet web page, url=www.windwire.com, Jan. 23, 2001.

OpenGrid, Internet web page, url=www.opengrid.com/products/, Jan. 23, 2001.

Aether Systems, Internet web page, url=www.aethersoftware.com, Jan. 23, 2001.

724 Solutions, Internet web page, url=www.724.com/productservice/fsp/fsp.htm, Jan. 23, 2001.

MessageVine, Internet web page, url=www.messagevine.com/products/products solutions.htm, Jan. 23, 2001.

Phone.com, "Phone.com Mobile Management Server" brochure, Aug. 1999.

Phone.com, "Phone.com Mobil Location Server" brochure, Sep. 2000.

Phone.com, Internet web page, url=www.phone.com/products/mls.html, Jan. 18, 2001.

Software.com, Internet web page, url=www.software.com/products/, Jan. 18, 2001.

"iPulse™Locator", Ericsson brochure, undated.

"Localized Internet", Ericsson brochure, undated.

@mobile.com, "Making The Web Wireless" brochure, undated.

* cited by examiner

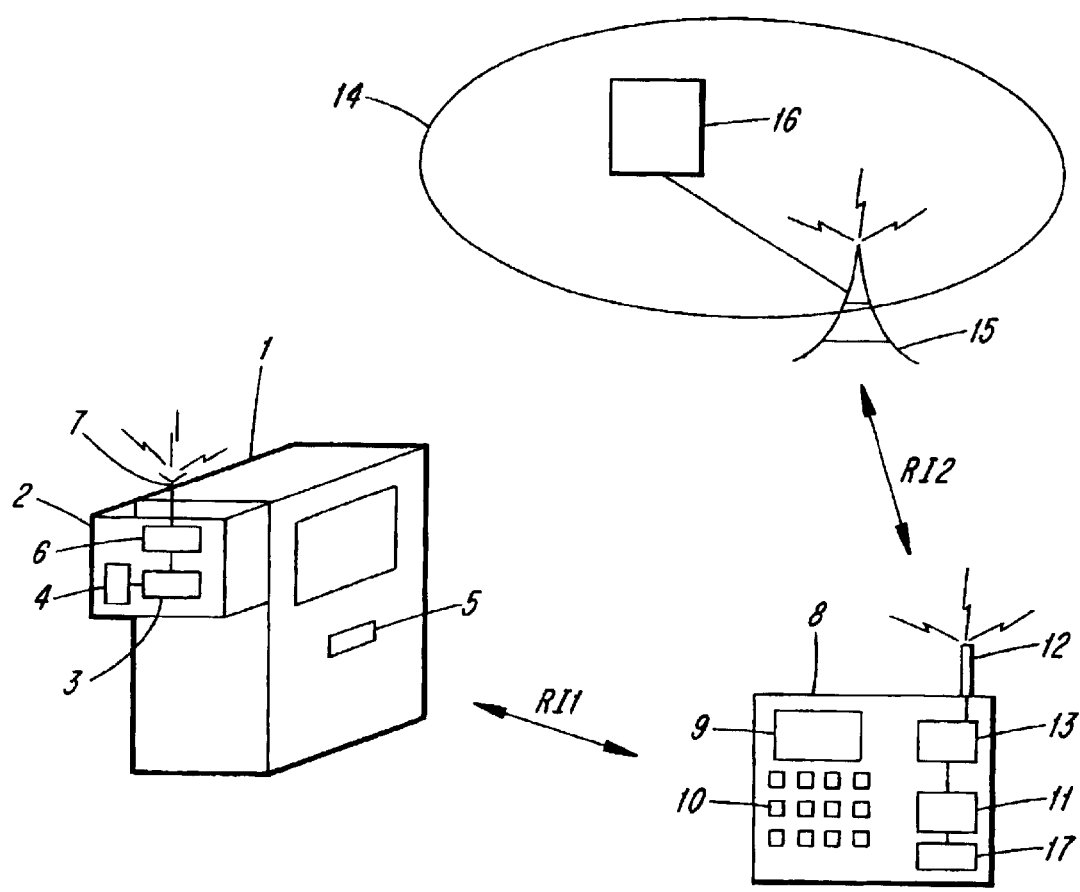

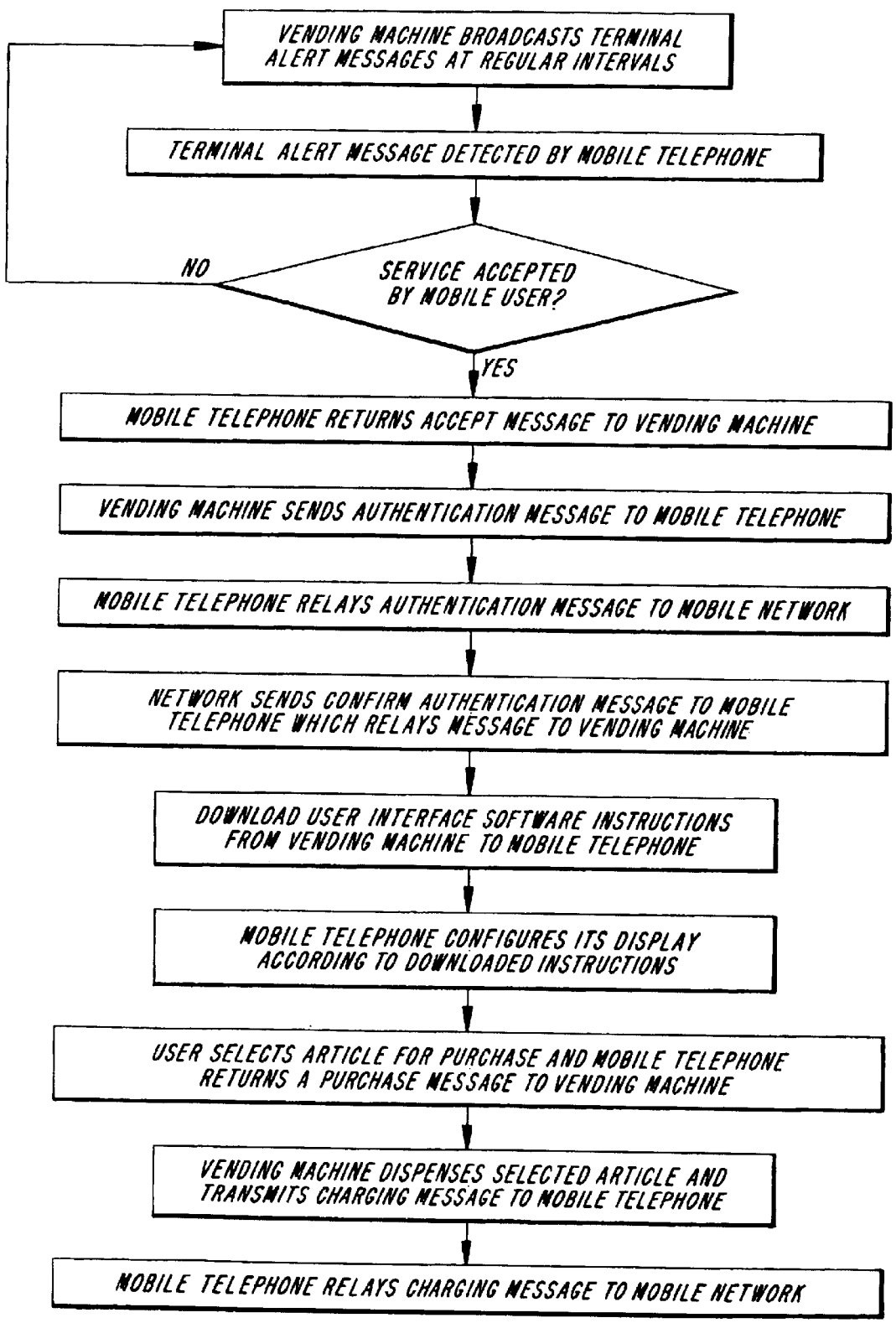

MOBILE TELEPHONE NETWORK ACCESS

FIELD OF THE INVENTION

The present invention relates to mobile telephone network access and more particularly to mobile telephone network access for stationary or mobile devices.

BACKGROUND OF THE INVENTION

With the increasing use of mobile telephones, proposals have been made to make use of mobile telephones to control and interact wirelessly with local systems. For example, JP 8249530 describes the use of a mobile telephone to purchase goods from a vending machine by sending a radio signal directly to the vending machine or alternatively by placing a call to the vending machine over a telephone circuit. The cost of a purchased article or service is charged to the telephone subscriber's telephone account. Similarly, the use of mobile telephones to purchase such things as train and airline tickets, as well as to remotely operate televisions, stereos, etc., can be envisaged.

Consumer take-up of products offering this type of functionality will depend to a large extent upon the interoperability of the products. The same applies to take-up by manufacturers. As such, the definition of some appropriate industry-wide standard for the radio interface between mobile terminals and local systems, e.g. vending machines, televisions, etc., is almost essential. A number of major electronics companies are currently working together in a project named "Blue Tooth" with the aim of providing such a standard.

Whilst the provision of a standard in this area will theoretically facilitate the interworking of mobile terminals with multiple local systems, a number of practical problems remain to be overcome.

Summary of the Present Invention

One such problem has been recognised by the inventors of the present invention. In order to enable a stationary or mobile device, hereafter referred to as a local system, to contact a mobile subscriber's operator, it has been thought necessary to provide the local system with either a connection to a fixed line telephone network or a direct connection to a mobile network, i.e. effectively providing the local system with its own mobile telephone. These options are potentially expensive and/or complex to install.

It is an object of the present invention to overcome or at least mitigate the disadvantages of current proposals for connecting a local system to a mobile network. This and other objects are achieved, at least in part, by making use of a mobile terminal in proximity to the local system to relay electronic transaction information from the local system to the mobile network. The local system can be a stationary or fixed device or it can be a mobile device possibly having a restricted mobility.

According to a first aspect of the present invention there is provided a method of conveying electronic information or locally generated messages from a local system like a stationary or mobile device to a mobile telephone network, the method comprising transmitting the information from the local system to a mobile terminal in close proximity to the local system via a local wireless communication link between said local system and said mobile terminal and subsequently relaying the information from the mobile terminal to the mobile network via the mobile network radio link. Preferably, the mobile terminal is a traditional or genuine mobile terminal like a mobile telephone or the like, which according to one aspect of the present invention is made capable of performing the relay function as described.

By utilising mobile terminals to relay information from a local system to a mobile network, it becomes no longer necessary to provide a direct connection between each and every local system and the telephone network. Thus, the cost and complexity of the local systems is reduced.

Preferably, the local system in close proximity to the mobile terminals is able to take at least partial temporary control over the mobile terminals and so to interact with the mobile terminals via said wireless communication link which preferably is a bi-directional link. For example, a mobile terminal user may conduct a transaction with the local system, e.g. where the local system is a vending machine or the like device of stationary or mobile nature, wherein the mobility may be restricted in relation to the genuine mobile terminals.

Preferably, the electronic information relayed by the mobile terminal from the local system to the mobile network comprises mobile terminal authentication data and/or financial data.

Preferably, the mobile terminal relays electronic information from the mobile network to the local system via the mobile radio network and the wireless communication link.

Preferably, the wireless communication link coupling the mobile terminal and the local system is a radio link. Alternatively however, the link may be an infra-red or an ultrasonic link.

Preferably, the method comprises enabling the user of a mobile terminal to allow or disallow the use of the terminal to relay information from the local system to the mobile network. This may either be done on a per transmission basis or may be a user definable setting of the terminal.

It is noted that the final destination (or source) of information relayed by a mobile terminal may be a component of the mobile network or may be a terminal or node coupled to the mobile network, e.g. via another telephone network or a data network, e.g. the Internet.

According to second aspect of the present invention there is provided apparatus for conveying electronic information from a local system like a stationary or mobile device to a mobile telephone network, the apparatus comprising:

transmitting means at the stationary or mobile device and receiving means at a mobile terminal, the transmitting and receiving means together providing a short range wireless transmission link;

first signal processing means at the stationary, or mobile device arranged to transmit said electronic information to the mobile terminal over said transmission link; and second signal processing means at the mobile terminal for receiving the transmitted information and for causing the information to be transmitted to the mobile network over the mobile radio link.

Preferably, the arrangement further comprises corresponding receiving means arranged at the stationary or mobile device for receiving signals transmitted by corresponding transmitting means arranged at the mobile terminal.

According to a third aspect of the present invention there is provided a mobile terminal arranged to communicate with a mobile telephone network via a mobile radio link, the terminal comprising:

receiver means for receiving information transmitted from a stationary or mobile device over a short range wireless link; and signal processing means for processing the received information into a format suitable for transmission over the mobile radio link and for subsequently causing the processed data to be transmitted over the mobile radio link to the mobile network.

Favorably the mobile terminal comprises corresponding transmission means arranged to transmit information to the stationary or mobile device.

BRIEF DESCRIPTION OF THE DRAWINGS

For a better understanding of the present invention and in order to show how the same may be carried into effect reference will now be made, by way of example, to the accompanying drawings, in which:

FIG. 1 shows schematically a vending machine and a mobile terminal which are able to interact with one another in accordance with an embodiment of the invention; and FIG. 2 is a flow diagram illustrating the method of operation of the system of FIG. 1.

DETAILED DESCRIPTION OF CERTAIN EMBODIMENTS

There is illustrated in FIG. 1 a vending machine 1 which is one example of a local system in which the present invention may be employed. Usually a vending machine 1 as such is more or less fixed or stationary, but in some cases it may also be more or less mobile and arranged, e.g., in a vehicle or the like. Articles which may be purchased from the vending machine include the likes of soft drinks, chocolate bars, etc. The vending machine has a control unit 2 which comprises a central processing unit 3 as well as a memory device 4 which stores control instructions for the central processing unit 3 as well as other data. The control unit 2 is electrically connected to the mechanical selection and outlet mechanism of the vending machine 1 such that the control unit can cause specific items to be dispensed to a consumer via an outlet tray 5 of the vending machine.

The control unit 2 also comprises a radio frequency transceiver 6 which is coupled on the one side to the central processing unit 3 via appropriate interface circuitry (not shown in the Figure) and on the other side to a transmitting and receiving antenna 7. The transceiver 6, antenna 7, and central processing unit 3 are arranged to communicate with mobile terminals such as mobile telephones via a standardised local radio air interface protocol RI1. The range over which such communications may be carried out is relatively small, e.g. of the order of 10 metres.

FIG. 1 illustrates a mobile telephone 8 which may be thought of as a "smart phone". The telephone 8 comprises a display 9 and a keyboard 10, as well as a central processing unit (or digital signal processor) 11. An antenna 12 and transceiver 13 of the telephone 8 enable the telephone to communicate in the normal way (over radio interface RI2) with a cellular telephone network 14 via a base station 15 of the network, e.g. using the GSM protocol. The central processing unit 11 is additionally able to communicate with the control unit 2 of the vending machine 1 using the previously mentioned standardised local air interface RI1. The same antenna 12 and transceiver 13 may be used for such local communications although another antenna and transceiver may be required. As the telephone 8 is able to communicate using two different protocols, it may be considered a "dual-mode" telephone.

In use, the control unit 2 is arranged to broadcast at regular intervals a Terminal Alert message over its 10 metres broadcast range. Mobile terminals such as the telephone 8 are programmed to listen for such Terminal Alert messages and, upon receipt, to alert the telephone user that the telephone is within the coverage range of a local system to which the user has access. The Terminal Alert message will typically contain additional information describing the service which the broadcasting system offers. This may be displayed as text or an icon on the display 9 of the telephone 8. A message is also displayed, asking the user to accept or reject the transmitted offer.

In the event that the user accepts the offer by pressing an appropriate key on the telephone's keyboard 10, an Accept message is returned from the telephone 8 to the vending machine's control unit 2 over the local connection RI1. Upon receipt of the Accept message, the central processing unit 3 of the control unit 2 transmits an Authentication message to the mobile telephone 8 over the local radio interface RI1. The message is recognised by the central processing unit 11 of the telephone 8 as being a message intended for the mobile network 14. The telephone 8 initiates a telephone call to the network 14 and transmits the Authentication message over interface RI2. The message is then conveyed to a charging and authentication database 16 within the network 14. This process of relaying the message from the vending machine to the telephone network may involve the vending machine effectively taking control of the mobile telephone.

The database 16 contains a record of mobile telephones which are entitled to use the services of the vending machine 1. Assuming that the mobile telephone is so entitled, a Confirm Authentication message is returned from the network 14 to the mobile telephone 8. The message is recognised by the central processing unit 11 as destined for the vending machine 1 and is relayed to the vending machine over the interface RI1. It will be appreciated that the authentication process (and charging process to be described below) involves a secure protocol such that the user of the mobile telephone 8 is not able to interfere in the process.

When the identity of the telephone 8 has been authenticated by the vending machine 1, the vending machine downloads a set of interface software instructions to the telephone 8 over the local wireless connection RI1. These instructions are received by the transceiver 13 of the telephone, and are stored in a memory 17. On the basis of the instructions, the central processing unit 11 of the telephone configures the user interface of the telephone 8 according to the specific requirements of the vending machine 1. For example, the downloaded instructions may result in a list of the goods available from the vending machine being available for display on the telephone's display 9. The user may then select an article to be purchased by using a scroll key, and by pressing an accept (or OK) key, whereupon the cost of the selected article is retrieved from the downloaded instruction set and displayed. The user may then conclude the transaction by again pressing the accept key. This final action results in a Purchase message being transmitted from the telephone 8 to the control unit 2 of the vending machine 1.

Upon receipt of the Purchase message, the central processing unit 3 of the control unit 2 instructs the vending machine to select and dispense the article identified in the Purchase message. The central processing unit 3 then transmits a Charging message to the mobile telephone 8 over interface RI1. As with the Authentication message, the Charging message is relayed by the telephone 8 to the mobile network 14 over interface RI2. The message is relayed to the charging and authentication database 16 which debits the transaction cost from the telephone user's account and credits it to an account held by the operator of the vending machine 1. It will be appreciated that other charging schemes may be used. For example, the cellular network operator may act as an electronic bank for the subscriber, holding a deposit of electronic money. Electronic money is transferred to the vending machine operator (or his bank) upon completion of the transaction.

The method described above is further illustrated in the flow diagram of FIG. 2.

It is likely that some of the subscribers may not wish to allow their telephones to be used for relaying messages as described above. As such, mobile telephones may provide a user option to either select or deselect the message relay function.

It will also be appreciated that the cost of relaying messages may be allocated to the subscriber or to the vending machine operator, or may be divided between the two.

It will be appreciated by the person of skill in the art that other modifications may be made to the above described embodiment without departing from the scope of the present invention. For example, whereas in the above embodiment, messages which originate from the vending machine 1 are transmitted from the mobile telephone to the mobile network by first establishing a telephone call, these messages may alternatively be sent for example over a signalling channel, e.g. using the GSM Short Message Service (SMS). In addition to relaying transaction messages, the present invention may be used to relay other information from the local system to the network (and onwards if necessary). For example, a vending machine may use a passing mobile telephone to relay a message that the vending machine requires re-stocking. This may be done with or without the knowledge and consent of the mobile telephone user.

What is claimed is:

1. A method of conveying electronic information from a stationary or mobile device to a mobile telephone network, the method comprising:
   sending a terminal alert message, which additionally contains information describing a service which the stationary or mobile device offers, from the stationary or mobile device to a mobile terminal;
   receiving the terminal alert message in the mobile terminal and sending an accept or reject message from the mobile terminal to the stationary or mobile device;
   transmitting the information from the stationary or mobile device to the mobile terminal in close proximity to the stationary or mobile device via a wireless communication link; and
   subsequently relaying the information from the mobile terminal to the mobile network via the mobile network radio link.

2. A method according to claim 1, wherein mobile terminals in close proximity to the stationary or mobile device are able to interact with said device via said wireless communication link, which is a bi-directional link.

3. A method according to claim 1, wherein the electronic information relayed by the mobile terminal from the stationary or mobile device to the mobile network comprises mobile terminal authentication data and/or financial data.

4. A method according to claim 1 and comprising relaying electronic information from the mobile network to the stationary or mobile device via the mobile radio network and the wireless communication link.

5. A method according to claim 1, wherein the wireless communication link coupling the mobile terminal and the local system is a radio link.

6. A method according to claim 1, wherein the local system in close proximity to the mobile terminals take at least partial temporary control over the mobile terminals and so to interact with the mobile terminals via said wireless communication link.

7. A method according to claim 1 and comprising enabling the user of the mobile terminal to allow or disallow the use of the terminal to relay information from the stationary or mobile device to the mobile network.

8. Apparatus for conveying electronic information from a stationary or mobile device (1) to a mobile telephone network (14), the apparatus comprising:
   transmitting means (6, 7) at the stationary or mobile device (1) and receiving means (12, 13) at a mobile terminal (8), the transmitting and receiving means together providing a short range wireless transmission link (RI1), wherein the transmitting means (6, 7) provide a terminal alert message, which additionally contains information describing a service which the stationary or mobile device offers, and receiving means (12, 13) is capable for receiving the terminal alert message;
   control means (10) at the mobile terminal for providing a user the possibility to accept or reject the terminal alert message;
   sending means (12, 13) at the mobile terminal for sending the accept or reject message from the mobile station to the stationary or mobile device;
   first signal processing means (3) at the stationary or mobile device (1) arranged to transmit said electronic information to the mobile terminal (8) over the transmission link (RI1); and
   second signal processing means (11) at the mobile terminal (8) for receiving the transmitted information and for causing the information to be transmitted to the mobile network (14) over a mobile radio link (RI2).

9. An apparatus according to claim 8, wherein the arrangement further comprises receiving means arranged at the stationary or mobile device (1) for receiving signals transmitted by transmitting means arranged at the mobile terminal (8).

10. A mobile terminal (8) arranged to communicate with a mobile telephone network (14) via a mobile radio link (RI2), the terminal comprising:
   receiving means (12, 13) for receiving information transmitted from a stationary or mobile device (1) over a short range wireless link (RI1), wherein the receiving means is capable of receiving a terminal alert message, which additionally contains information describing a service which the stationary or mobile device offers;
   control means (10) for providing a user the possibility to accept or reject the terminal alert message;
   sending means (12, 13) for sending the accept or reject message from the mobile station to the stationary or mobile device; and
   signal processing means (11) for processing the received information into a format suitable for transmission over the mobile radio link (RI2) and for subsequently causing the processed data to be transmitted over the mobile radio link (RI2) to the mobile network (14).

11. A terminal according to claim 10, wherein the mobile terminal (8) comprises transmission means arranged to transmit information to the stationary or mobile device (1).

* * * * *